United States Patent [19]

Underwood

[11] Patent Number: 5,039,537

[45] Date of Patent: * Aug. 13, 1991

[54] HIGH BROWNING LIQUID SMOKE COMPOSITION AND METHOD OF MAKING A HIGH BROWNING LIQUID SMOKE COMPOSITION

[75] Inventor: Gary L. Underwood, Manitowoc, Wis.

[73] Assignee: Red Arrow Products Co. Inc., Manitowoc, Wis.

[*] Notice: The portion of the term of this patent subsequent to Sep. 25, 2007 has been disclaimed.

[21] Appl. No.: 416,963

[22] Filed: Oct. 4, 1989

Related U.S. Application Data

[60] Continuation-in-part of Ser. No. 343,928, Apr. 26, 1989, Pat. No. 4,959,232, and a continuation-in-part of Ser. No. 358,650, May 26, 1989, Pat. No. 4,994,297, which is a division of Ser. No. 119,673, Nov. 12, 1987, Pat. No. 4,876,108.

[51] Int. Cl.$^5$ .............................................. A23L 1/221
[52] U.S. Cl. ................................... 426/271; 426/314; 426/490; 426/650
[58] Field of Search ............... 426/315, 271, 534, 650, 426/431, 520, 524, 655, 314

[56] References Cited

U.S. PATENT DOCUMENTS

| | | | |
|---|---|---|---|
| 3,106,473 | 10/1963 | Hollenbeck | 99/229 |
| 3,531,463 | 9/1970 | Gustafson | 260/211.5 |
| 4,224,415 | 9/1980 | Meitzner et al. | 521/38 |
| 4,297,220 | 10/1981 | Meitzner et al. | 210/690 |
| 4,359,481 | 11/1982 | Smits et al. | 426/533 |
| 4,431,032 | 2/1984 | Nicholson | 138/118.1 |
| 4,431,033 | 2/1984 | Nicholson | 138/118.1 |
| 4,496,595 | 1/1985 | Nicholson | 426/284 |
| 4,504,507 | 3/1985 | Nicholson | 426/533 |
| 4,657,765 | 4/1987 | Nicholson | 426/262 |
| 4,717,576 | 1/1988 | Nicholson | 426/533 |
| 4,876,108 | 10/1989 | Underwood | 426/315 |

FOREIGN PATENT DOCUMENTS

| | | |
|---|---|---|
| 932686 | 8/1973 | Canada . |
| 1121650 | 4/1982 | Canada . |
| 1193131 | 9/1985 | Canada . |
| WO88/00935 | 2/1988 | PCT Int'l Appl. . |
| 1137637 | 12/1968 | United Kingdom . |

OTHER PUBLICATIONS

Ray, C., et al., "The Pyrolysis under Vacuum of Aspen Poplar", Fundamentals of Thermochemical Biomass Conversion, 237–256 (1985).

Scott, D. S., et al., "Production of Liquids from Biomass by Continuous Fast Pyrolysis", *Bioenergy* 84, vol. 3, *Biomass Conversion*, 15–22.

Graham, K. G., et al., "Fast Pyrolysis of Biomass", Journal of Analytical and Applied Pyrolysis 6:95–135 (1984).

Piskorz, J. et al., "On the Mechanism of the Rapid Pyrolysis of Cellulose".

Menard, H., et al. "Characterisation des Jus Pyrolytiques en Provenance de differents Procedes de converstion du Bois", Fifth Canadian Bioenrgy R & D Seminar (1984).

"Rapid Mixing Studies Between Transported Solids in an Ultra-Rapid Fluidized Reactor", D. A. Berg et al.; presented at Powder and Bulk Solids Conference, Rosemont, IL (May 1985).

Berg, D. A., et al., "Characterization of Solids Mixing in an Ultra-Rapid Fluidized Reactor", presented at Powder and Bulk Solids Conference, Rosemont, IL (May 12–15 1986).

*Primary Examiner*—Carolyn Paden
*Attorney, Agent, or Firm*—Marshall, O'Toole, Gerstein, Murray & Bicknell

[57] ABSTRACT

This invention relates to a high browning liquid smoke composition made from the condensable liquids of pyrolyzed wood or cellulose. The high browning liquid smoke composition has the capability to flavor and to impart characteristic smoke color to a foodstuff and has a brix less than about 50, a browning index greater than about 30, and a transmittance value of greater than about 50% at 590 nm. A method of making the high browning liquid smoke composition and the use of the composition with a food product is also disclosed.

31 Claims, 1 Drawing Sheet

HIGH BROWNING LIQUID SMOKE COMPOSITION AND METHOD OF MAKING A HIGH BROWNING LIQUID SMOKE COMPOSITION

CROSS-REFERENCE TO RELATED APPLICATIONS

This application is a continuation-in-part of patent application Ser. No. 07/343,928 filed Apr. 26, 1989, U.S. Pat. No. 4,959,232 and patent application Ser. No. 07/358,650 filed May 26, 1989, now U.S. Pat. No. 4,994,297; which is a divisional application of patent application Ser. No. 07/119,673 filed Nov. 12, 1987, now U.S. Pat. No. 4,876,108.

BACKGROUND

The present invention generally relates to a method of making a liquid smoke composition from the condensable products resulting from the fast pyrolysis of wood or cellulose and, more particularly, to a method of making a high browning liquid smoke composition. The high browning liquid smoke composition of this invention may be used to color and flavor edible foodstuffs.

Use of liquid smoke solutions as a replacement for smoking food by direct contact with wood smoke has become a standard industry practice. When applied to the surface of meats, proteinaceous foodstuffs and food casings, liquid smoke will give the food a characteristic smoke flavor and produce a dark smoked color. The achievement of a smokehouse-like product by application of a liquid smoke solution to food requires controlling and balancing many related variables such as the food composition, the temperature and humidity, the processing and contact time, and the amount and concentration of smoke solution applied.

For example, when applying a liquid smoke solution to a meat, the processor normally must compromise the smoke color or browning of the meat to keep the flavor at a desired level because the flavor imparting ability of known liquid smoke solutions is generally too intense at a desired smoked color. There is a need in the industry for a liquid smoke solution with good coloring or browning properties that has acceptable flavoring properties.

Liquid smoke is a complex and variable mixture of chemicals produced during pyrolysis and includes many compounds, some of which are normally liquid at room temperature. Pyrolysis is a general term for the thermal decomposition of any organic matter, such as wood, plants, or fossil fuels, which occurs either during combustion or in the absence of combustion. Combustion uses the oxidation or burning of a portion of the organic matter to provide the thermal energy required to vaporize and decompose the remainder of the matter. For pyrolysis without combustion, thermal energy must be supplied indirectly from an external source, such as radiation, solid, or gaseous heat carriers, or from thermal conduction through reactor walls. The externally supplied thermal energy vaporizes and decomposes the organic matter without directly oxidizing or burning it.

Either method of pyrolysis produces condensable liquids, non-condensable gases and solids in varying proportions depending upon reaction conditions. The condensable liquids from pyrolyzed wood can be further sub-divided into water soluble organics and water insoluble tars. It is known that the desirable active ingredients for flavoring foodstuffs found in smoke solutions are among the water soluble organics.

The production of commercially produced liquid smoke solutions typically begins with smoke made by pyrolysis and limited combustion of wood. After pyrolysis or combustion, the smoke is subsequently collected and fed through a column countercurrent to the flow of recirculating water. The resulting dilution of the condensable smoke components in water results in the removal of undesired tars and water insoluble components; however, further refinement of the liquid solution is needed for the food flavoring or coloring applications described above. A typical commercial liquid smoke preparation for surface applications to foodstuffs is the liquid smoke flavoring described in U.S. Pat. No. 3,106,473 to Hollenbeck.

Current conventional pyrolysis methods are characterized by relatively slow thermal reactions which occur at moderate temperatures. In a typical commercial process for example, wood feedstock, generally dried ground sawdust, is fed into a pyrolysis system at elevated temperatures. The sawdust is maintained at these temperatures for more than one minute. These conventional pyrolysis methods suffer from relatively poor yields of liquid smoke products which have less than desired browning or flavoring properties.

Improved pyrolysis products may be obtained using fast or flash pyrolysis methods. Fast pyrolysis methods employ extremely fast heating rates and short material and vapor residence times to yield high quality liquid smoke compositions. The heating rate for fast or flash pyrolysis may be greater than 1000° C. per second and vapor residence times may be less than 2 seconds. The liquid smoke solutions produced by fast pyrolysis methods are generally preferred to liquid smoke solutions made using conventional pyrolysis methods. A method of making fast pyrolysis liquid smoke is described in U.S. Pat. No. 4,876,108 and the related divisional application Ser. No. 07/358,650 filed May 26, 1989. The entire contents of both applications are incorporated by reference herein.

The color and flavor chemistry of liquid smoke compositions is highly complex as evidenced by the over four hundred compounds identified as constituents of these compositions. A summary of the many constituents found in liquid smoke is listed by Maga in "Smoke in Food Processing" *CRC Press*, pp. 61-68 (1968).

Although there are hundreds of different chemical species present in liquid smoke, the species are generally divided into five classes based on chemicals having distinct functional groups. The five classes generally are acids, carbonyls, phenols, basics and neutrals. A majority of researchers skilled in the art of smoke solutions have concluded that phenols are primarily flavoring and aroma compounds, carbonyls are mainly responsible for surface coloration, and acids are principally preservatives and pH controlling agents. Acids and carbonyls also make a secondary contribution to flavor and may enhance the surface characteristics of smoked meat products.

A representative commercial liquid smoke product, for example, with a titratable acidity level of about 11% contains about 13% carbonyls, about 1.5% phenols, and at least 70% water. The remaining constituents, about 4.5% of the total mass balance of the smoke, include basic and neutral organic compounds.

Where surface coloring is important, measuring the amount of active carbonyls in a solution may determine the browning or coloring properties of a liquid smoke composition. The active carbonyls are believed to initially react with the available amino groups on surface proteins of a foodstuff. Subsequent reactions occurring under drying and heating conditions lead to the formation of the characteristic brown smoked color. The concentration of a specific carbonyl species, hydroxyacetaldehyde, is also a good indicator of the coloring or browning potential of a liquid smoke solution.

Another measurement that is used to characterize liquid smoke is the browning index defined according to procedures described below. The browning index is also used in the smoke flavoring industry to measure the browning or coloring performance of a liquid smoke solution.

Liquid smoke solutions may be used to color and flavor comestible food products by treating the food in a variety of ways. The application of liquid smoke may be done on individual items in batch or continuous modes by spraying on dipping. For large batches, an atomized cloud of liquid smoke may be used. In addition, sausages, bologna and hams may be processed in casings into which liquid smoke solutions have been incorporated.

SUMMARY OF THE INVENTION

This invention encompasses a high browning liquid smoke composition having a brix less than about 50, a browning index greater than about 30 and a transmittance value of greater than about 50% at 590 nm. Preferably, the browning index is greater than about 35 for a liquid smoke composition having a brix less than about 45.

This invention also encompasses a method for making a very high browning liquid smoke composition comprising the steps of:

collecting the condensable liquids produced by the fast pyrolysis of wood or cellulose to give a raw liquid smoke composition;

diluting the raw liquid smoke with water to substantially separate water insoluble smoke components from water soluble components to give a diluted liquid smoke of less than about 40 brix;

contacting the diluted liquid smoke mixture with a nonionic polymeric resin to give a treated liquid smoke composition; and concentrating the treated liquid smoke to give a high browning liquid smoke composition having a brix less than about 50, a browning index greater than about 30, and a transmittance value of greater than about 50% at 590 nm.

The pyrolysis products of cellulose may not need to be contacted with a nonionic polymeric resin but may simply be filtered in order to provide a concentrated liquid smoke having a transmittance value greater than 50% at 590 nm.

Thus, the present invention also provides for a method of making a high browning liquid smoke composition comprising the steps of:

collecting the condensable liquids produced by the fast pyrolysis of cellulose to give a raw cellulose liquid smoke composition;

diluting the raw cellulose liquid cellulose liquid smoke with water to substantially separate water insoluble smoke components from water soluble components to give a diluted cellulose liquid smoke of less than 40 brix; and concentrating the diluted cellulose liquid smoke to give a high browning liquid smoke composition having a brix less than about 50, a browning index greater than about 30, and a transmittance value of greater than about 50% at 590 nm.

DETAILED DESCRIPTION OF THE INVENTION

Figure 1:
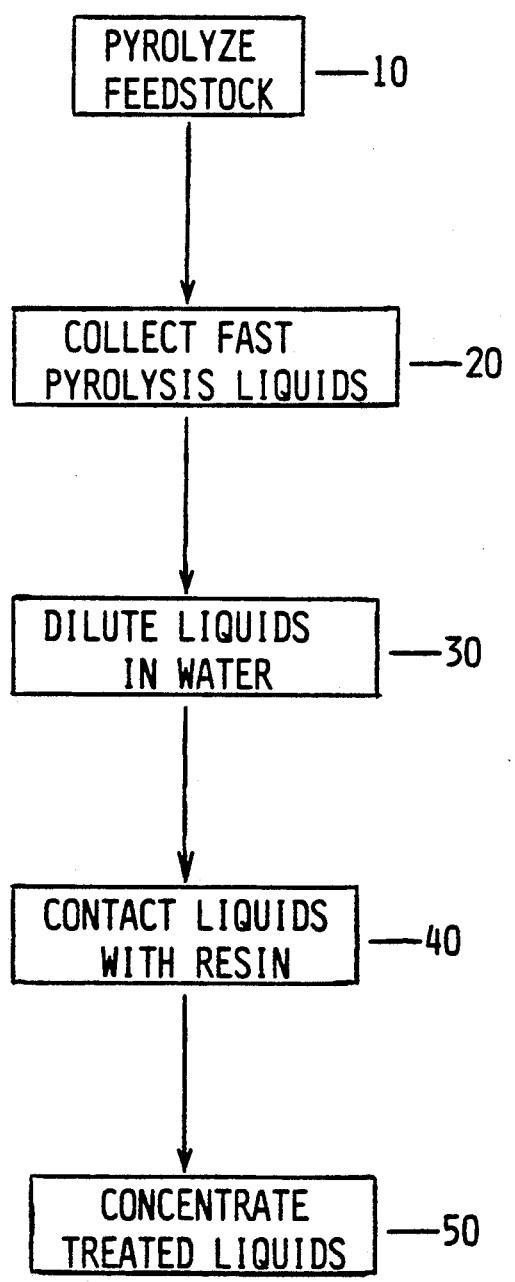
FIG. 1 schematically illustrates the steps of a process of this invention to produce a high browning liquid smoke composition.

The present invention provides a high browning liquid smoke composition having a brix less than about 50, a browning index greater than about 30 and a transmittance value greater than 50% at 590 nm. A preferred liquid smoke composition has a brix less than about 45, and a browning index greater than 35. A more preferred liquid smoke composition has a brix less than about 45 and a browning index between 30-65.

This invention also provides a method for making high browning liquid smoke compositions by collecting the raw condensable products obtained from the fast pyrolysis of wood or cellulose, diluting the raw condensable products with water to substantially separate the undesired tar components, contacting the water soluble components with a nonionic polymeric resin to give a treated liquid smoke solution, and concentrating the treated liquid smoke solution to give the desired high browning, liquid smoke composition. Alternatively, when cellulose is pyrolyzed, contact with the nonionic resin may not be required if the transmittance value is still greater than 50% at 590 nm after concentrating to a desired brix. Preferably, the diluted cellulose liquid smoke is filtered to remove unwanted particulates which may lower the transmittance value after concentrating to a desired brix.

The sequence of process steps is schematically illustrated in FIG. 1. The starting materials used to produce the compositions of this invention are prepared by pyrolyzing a feedstock 10 and collecting the pyrolysis products 20 to give the raw liquid smoke starting materials. The raw liquid smoke starting materials are further processed by diluting with water 30 to give a diluted liquid smoke and contacting the diluted liquid smoke with a nonionic polymeric resin 40, if needed, to give a treated liquid smoke. In a last step, concentrating the treated liquid smoke 50 gives a high browning liquid smoke composition.

Preparation of Starting Materials

The high browning liquid smoke composition of this invention is preferably made from the condensable products of the fast pyrolysis of wood or cellulose. In addition, other lining-cellulose sources are also acceptable for use as pyrolysis feedstock. The pyrolysis feedstock may be any suitable wood product, but is preferably hardwoods such as maple, hickory, birch, oak, beech or poplar.

The fast pyrolysis process is designed to achieve a very high temperature in a minimum time and to have a relatively short residence time at the high temperature. The parameters that are preferably optimized in a fast pyrolysis method to produce suitable raw liquid smoke for use as starting materials include:

1) a high heating rate of the wood feedstock, preferably greater than 1000° C. per second;

2) a short vapor residence time, preferably an average time such that the gas/vapor phase remains in the reactor greater than about 0.15 second and less than about one second and more preferably less than about 0.6 second;

3) an isothermal reactor temperature between about 400°–800° C.; and 4) a quenching of the gas/vapor product to a temperature of about less than 300° C., preferably in less than about 0.6 seconds, in order to preserve the high liquid yield.

A short residence time at a high temperature has been achieved by a number of systems. One system is a vacuum pyrolysis process that is based on the principle that primary products can be withdrawn from the reactor under vacuum conditions before they have a chance to react further and produce secondary pyrolysis products. This method is described by Roy, et al., "Pyrolysis under Vacuum of Aspen Poplar," *Fundamentals of Thermo-Chemical Biomass Conversion*, Elsevier Publishers, (1985). In this method, the wood feedstock remains in the reactor until completely reacted. Total liquid yields of between 68–74% by mass of the total wood feedstock are reported at reaction temperatures of 450° C. and a solid heating rate of 10° C. per minute, and a residence time of up to 2 seconds. At a vapor residence time of about 2 seconds the char yields were between 16–20% by mass of the wood feed material.

When a vacuum pyrolysis apparatus is used, the heating rate of the wood or cellulose is much slower compared with rapid thermal processing apparatus or with a fluidized bed reactor. Secondary pyrolysis reactions, however, are reduced by quickly removing and cooling the primary pyrolysis vapors. Accordingly, the fast heating rate is not essential as long as the secondary reactions are limited.

A second system for obtaining fast pyrolysis is "flash" pyrolysis, using a fluidized bed reactor system operating at bed temperatures between 400°–650° C. Total liquid yields of between 60–70% of the wood feedstock have been obtained with an average vapor residence time of 0.5 seconds. The char yield was typically between 10–20% of the wood mass. Residence times of up to 3 seconds may be achieved. See for example, Scott, et al., "Production of Liquids from Biomass by Continuous Fast Pyrolysis," *Bioenergy* 84, Vol. 3, *Biomass Conversion*.

A third system is a fast pyrolysis process which uses hot particulate solids and/or inert gases to rapidly transfer heat to the wood feedstock in a reactor system. This process results in very high gas or very high liquid yields from biomass depending upon the reactor conditions. Char yields are from 0–6% depending upon the feedstock, reactor temperature and residence time. Maximum gas yields may be about 90% of the feedstock mass at 900° C. and maximum liquid yields may be about 85% of the feedstock mass at 600°–650° C. This type of apparatus can be operated at a temperature between 350°–1000° C. with a residence time between 0.03–3 seconds. A suitable apparatus for this process is described in patent application Ser. No. 07/358,650 filed May 26, 1989 and U.S. Pat. No. 4,876,108.

Dilution of Raw Liquid Smoke

After collection of the raw liquid smoke starting materials, water is added to the raw liquid smoke to cause a substantial phase separation and to allow separation of benzo(a)pyrene and undesired tars from the desired liquids. The amount of water added beyond that necessary to achieve effective phase separation is a matter of choice. The more water added, the greater the precipitation of higher molecular weight components. Preferably, the level of undesired benzo(a)pyrene and tars in the fast pyrolysis liquids after phase separation is sufficiently lowered to allow a more concentrated high browning product to be produced.

After dilution and phase separation, the ratio of carbonyls to phenols is relatively high, which is indicative of the high browning potential relative to the amount of flavor. The ratio of carbonyls to phenols is generally higher than the ratio of carbonyls to phenols found in a commercially available liquid smoke composition. For example, an unconcentrated commercial liquid smoke may have a total carbonyls concentration between about 4–15% and a browning index between about 3–13. While methods are available for concentrating commercial liquid smoke to achieve a browning index of up to about 25, unconcentrated liquid smoke has a practical upper limit for the browning index of about 13 because the benzo(a)pyrene levels become excessive if the liquid smoke is concentrated above this level in the water collection baths.

Through the use of fast pyrolysis methods, browning indexes of up to about 50 may be achieved without using any concentration steps and with acceptably low levels of benzo(a)pyrenes, preferably below 0.5 ppb.

The presence of hydroxyacetaldehyde is useful as an index to rate the value of the liquid for smoke coloring applications. The yield of this compound by fast or flash pyrolysis methods increases with a decrease in both pyrolysis temperature and residence time. Yields of hydroxyacetaldehyde in excess of 8% by total mass may be obtained at reaction temperatures of about 550°–600° C. and a vapor residence time of about 0.1 second.

The yield of hydroxyacetaldehyde is much greater from fast pyrolysis methods than from conventional methods. A comparison of yields of hydroxyacetaldehyde from two fast pyrolysis methods and a commercial liquid smoke is set out in Table 1. As can be noted, yields up to about 4 times higher are achieved using fast pyrolysis. Hydroxyacetaldehyde is one of the predominant carbonyls in wood or cellulose pyrolysis liquids and is therefore used as an index to assess a liquid's browning potential.

TABLE 1

| CHEMICAL ANALYSIS OF PYROLYSIS LIQUIDS (Hydroxyacetaldehyde Yields) | |
| --- | --- |
| Sample Source | Hydroxyacetaldehyde Yield (% w/w) |
| 1. Fluidized Bed (450 to 550° C., 0.5 s) | 7.5–8.5 |
| 2. Rapid Thermal Processing (550 to 700° C., 0.2 s) | 7.0–8.0 |
| 3. Commercial Liquid Smoke | less than 1 |

Resin Treatment of Diluted Liquid Smoke

After dilution, the liquid smoke solutions which may be treated with nonionic polymeric resin will generally be in a range of about 4–40 brix, preferably in a range of about 5-30 brix and most preferably in a range of about 20-25 brix. Brix is an indication of the percentage of soluble organics in solution. While normally used in measuring sugar solutions, a brix value or number is an effective approximation of the non-water smoke components in a liquid smoke composition or solution. The usual limit of brix beyond which polycyclic aromatic hydrocarbons, harsh flavored phenols and tars become soluble in liquid solutions of smoke during production from vaporous smoke is about 30 brix.

It has been found that nonionic polymeric resins are effective in removing undesired components, such as phenols, from solutions up to about 40 brix. Above this limit, the solvating effect of the organics in solution begins to overcome the ability of the polymeric resins to remove these compounds.

One skilled in the art would readily recognize there are different ways to contact the nonionic polymeric resins with the diluted liquid smoke. Both batch and flow processes are acceptable methods.

The preferred method of treatment of liquid smoke solutions to produce the compositions of this invention is to pass a liquid smoke solution through a column of a suitable nonionic polymeric resins. In this way, the maximum amount of solution may be treated with a given amount of polymeric resin before regeneration, due to adsorption of undesired components, is required. A water rinse may be employed before regeneration in order to maximize product yield.

Treatment with the nonionic polymeric resins increases the transmittance values and decreases the brix of the treated solutions. Thus, a 25 brix diluted liquid smoke solution having a phenol range of about 14-20 mg/ml may yield a composition having about 18-23 brix, a transmittance value of about 50-90% at 590 nm, and a browning index substantially about the same as before polymeric resin treatment. Thus, treated compositions will have essentially the same capability of browning meats both before and after contact with the polymeric resin. Solutions of commercially available liquid smoke with brix values of about 25-30 generally have browning index values of about 10-12. The liquid smoke solutions of the present invention have brix values less than 50 and browning indexes greater than 30.

Polymeric resins suitable for practicing the present invention are know in the art. U.S. Pat. No. 3,531,463 to Gustafson, describes processes for preparing nonionic polymeric resins and using the polymeric resins to separate an organic component from an aqueous solution. U.S. Pat. No. 4,297,220, issued Oct. 27, 1981 and U.S. Pat. No. 4,224,415, issued Sept. 23, 1980 both to Meitzner, et al. describe water insoluble, macroreticulated polymeric resins. These patents generally describe polymeric resins useful for the process of the present invention.

The polymeric resins described in U.S. Pat. Nos. 3,531,463, 4,297,220, and 4,224,415 are suspension polymerized copolymers of a monoethylenically unsaturated monomer and a cross-linking polyvinylidene monomer. Suitable monoethylenically unsaturated monomers are alkyl acrylates and alkyl acrylate esters, cycloalkyl acrylates, substituted phenyl acrylates and benzyl acrylate.

Preferably the polymeric resin is made of lower alkyl esters of acrylic acid in which the alkyl group contains from one to five carbon atoms.

Copolymers of the above monomers with monovinylene compounds such as dialkyl maleates, dialkyl fumarates, dialkyl crotonates, dialkyl itaconates, and dialkyl glutaconates, are also possible.

Suitable polyvinylidene compounds include unsubstituted and substituted divinylbenzenes and divinylpyridines. Particularly preferred polyvinylidene monomers, commonly know as "cross-linkers", include polyvinylaromatic hydrocarbons, such as divinylbenzene and trivinylbenzene. Glycol dimethacrylates, such as ethylene glycol dimethacrylate, and polyvinyl ethers of polyhydric alcohols, such as divinyloxyethane and trivinyloxypropane are also useful cross-linkers.

If a monovinylaromatic hydrocarbon, such as the monovinylidene monomer, and a divinylaromatic hydrocarbon, such as a divinylbenzene, are used, a cross-linked polystyrene is formed by copolymerization in the presence of a precipitant.

The polymeric resins may be modified by attaching charged or polar groups to the polymer. The type of charged or polar group is selected to provide variable polymeric properties.

The polymeric adsorbents are typically hard, insoluble beads which have high porosity and high surface area. A bead will have a nominal mesh size of about 20-60 and the polymeric surface may be chemically modified to provide beads having varying polarities and surface characteristics. The polymeric resins may be available in other formats, such as gels.

Commercially available nonionic polymeric resins are useful to practice this invention. Resins sold by Rohm and Haas under the trade names XAD-2, XAD-4, XAD-7, XAD-8 and XAD-16 are all suitable polymeric resins which provide selective removal of undesired components from liquid smoke solution. The XAD-4 polymeric resin is a preferred polymeric resin.

Concentration of Treated Liquid Smoke

After dilution or after contacting the polymeric resin, if needed or desired, the diluted or resin treated liquid smoke solution is concentrated until the browning index reaches a desired value, preferably until the browning index value is greater than 30. The browning index of a liquid smoke solution may be lowered by exposure to elevated temperatures for extended time periods, therefore, the diluted or resin treated liquid smoke is concentrated at reduced pressures in order to perform the concentration at reduced temperatures. Preferably, the concentration temperature is below 100° C. and most preferably below about 50° C. A preferred concentration of the liquid smoke composition occurs when using a reduced pressure of about 29 inches of mercury and a temperature of about 50° C.

After concentration, a preferred liquid smoke compositions has a transmittance value greater than about 50% at 590 nm. The transmittance value is determined from a sample diluted 1:10 with water.

Application to Foods Casings

Food casings that are suitable for use in the present invention are tubular casings, and preferably tubular cellulosic casings, that are prepared by any one of the methods well known in the art. Such casings are generally flexible, thin-walled seamless casings formed of regenerated cellulose or cellulose ethers, such as hydroxyethyl cellulose, in a variety of diameters. Also suitable are tubular cellulosic casings having a fibrous reinforcing web embedded in the wall of the casings, commonly called fibrous food casings. Cellulosic casings without the fibrous reinforcement are commonly called non-fibrous cellulosic casings.

The high browning liquid smoke may be applied to the outer surface of the food casing by passing the casing through a bath of the liquid smoke composition. The liquid smoke is generally allowed to soak into the casing before doctoring off any excess liquid smoke by passing the casing through squeeze rolls or wipers for an amount of time sufficient for the casing to incorporate the desired amount of smoke coloring and flavoring into the casing. The high browning liquid smoke composition may also be externally applied to the casing by methods other than dipping, such as spraying, brushing, or roll-coating.

One method of treating the casing with the liquid smoke of this invention involves passing a flattened, tubular, cellulose sausage casing over guide rolls through a dip tank which contains the liquid smoke composition. The casing passes over additional guide rolls after exiting the dip tank, and then passes between squeeze rolls which minimize any excess carryover of the liquid smoke composition. The total contact time of the casing with the liquid smoke composition in the dip tank, and with excess liquid smoke composition on the casing passing over the guide rolls before the casing passes through the squeeze rolls, typically determines the amount of smoke coloring and flavoring of the liquid smoke composition that the casing will incorporate. The casing is then sent on to conventional further processing, including conventional humidification, as may be required, and conventional shirring.

Alternatively, the high browning liquid smoke composition may be applied to the internal surface of the casing by any of several well-known procedures. These include slugging or bubble coating, spraying, and coating while shirring. The slugging method for coating the inside of a casing involves filling a portion of the casing with the coating material, so that the slug of coating material generally resides at the bottom of a "U" shape formed by the casing being draped over two parallel rollers, and then moving the continuous indefinite length of casing so that the slug of coating material remains confined within the casing, while the casing moves past the slug and is coated on its inside wall by the coating material contained within the slug.

It may be shirred by conventional methods or, prior to shirring, it may dried or humidified before shirring to a water content suitable for shirring or further processing. The need for conventional drying or humidification after the external liquid smoke treatment depends on the water content of the casing after treatment and the type of casing. If the casing is a non-fibrous casing, a water content within the range of from about 8-18 wt. % water immediately before shirring is typical, and for fibrous casing a water content within the range of from about 11-35 wt. % water immediately before shirring is typical, where percent is based on the total weight of casing including water.

It is to be noted that the liquid smoke which is coated on the casing surface, whether externally coated or internally coated, does not exist solely as a surface coating. Color and flavor components of the liquid smoke composition which are coated on the surface penetrate the cellulosic structure of the casing as the cellulose absorbs the moisture of the smoke solution.

The following examples are provided to further illustrate specific aspects and practices of this invention. These examples describe particular embodiments of the invention, but are not to be construed as limitations of the appended claims.

EXAMPLE 1

Fast Pyrolysis of Ground Wood

Example 1 shows a fast pyrolysis of a wood feedstock.

FLUIDIZED BED OPERATION

Operating Parameters

Poplar wood was ground to about 595 microns (30 mesh)

Wood moisture content was about 6% (wet basis)

Wood was fed at a rate of 1-2.5 kg/h

Reaction temperatures in the bed were in the range of 400°-650° C.

Vapor residence times were typically in the range of 500-700 milliseconds

The fluidized bed consisted of Ottawa silica sand with a mean particle size of about 720 microns Recycled product gas (primarily CO, $CO_2$ and $CH_4$) was used to fluidize the sand and to transport the wood feedstock into the reactor.

Equipment and Operating Procedure

Poplar wood, other wood species, straw, peat, or the like, is air dried, milled, and screened to about 595 micron particle size.

The prepared feedstock is conveyed from a hopper into a variable speed twin-screw feeder and discharged into a flow of recycled product gas. It is then conveyed into the fluidized bed reactor directly into the fluidized bed region.

The reactor bed contains highly spherical Ottawa silica sand with a mean particle size of about 720 $\mu$m.

The fluidizing gas, primarily CO, $CO_2$ and $CH_4$ is preheated in the inlet line by electrical heaters and enters the bed through a porous stainless steel plate at a rate which is equivalent to 1.2-2 times the minimum fluidization velocity.

The reactor is wrapped with heating coils for supplemental heating.

Pyrolysis products and the recycle gases are swept from the top of the reactor into a cyclone where the dry char is removed from the gas/vapor phase. The gases and vapors are then directed to two condensers and finally to a series of filters.

The first condenser is normally maintained at 20° C. and the second condenser is maintained at about 0° C.

The filter train consists of an in-line 5 micron mesh screen followed by a filter vessel packed with glass wool.

The preferred operating temperature of the fluidized bed is between about 400°-600° C. with a relatively short residence time of about 0.030-0.06 second. However, good yields are achieved at higher temperatures and over a variety of residence times. The shorter the residence time, the higher the yields of the preferred liquid product.

A sample of the above liquid pyrolysate was diluted with water and the water soluble fraction was separated and analyzed. The results of the analysis are shown in Table 2.

TABLE 2
DILUTION OF FAST PYROLYSIS LIQUIDS

| Weight % Fast Pyrolysis Liquids in Total Solution | Acids % w/w | Phenols % w/w | Carbonyls % w/w | Browning Index Units | Specific Gravity @ 23° C. | Benzo(a) Pyrene ppb |
|---|---|---|---|---|---|---|
| 100 | 10.5 | 5.50 | 32.5 | 49.0 | 1.245 | 19.0 |
| 85 | 9.1 | 3.75 | 29.2 | 46.8 | 1.201 | 14.0 |
| 80 | 8.7 | 3.31 | 26.6 | 45.6 | 1.182 | 3.6 |
| 70 | 7.9 | 2.42 | 21.4 | 35.8 | 1.148 | 0.5 |
| 65 | 7.5 | 2.10 | 20.2 | 33.8 | 1.120 | 0.5 |
| 60 | 6.5 | 1.65 | 17.5 | 31.5 | 1.112 | 0.5 |
| 40 | 4.1 | 0.820 | 10.3 | 18.2 | 1.065 | 0.5 |
| 20 | 2.8 | 0.430 | 5.4 | 12.2 | 1.028 | 0.5 |
| 10 | 1.3 | 0.230 | 4.9 | 5.6 | 1.011 | 0.5 |

EXAMPLE 2

Example 2 shows that no decrease in browning index results from treatment with nonionic polymeric resins over the entire range of phenol reduction which is possible. Also shown is the maximum amount of liquid smoke solution which can be processed with a given amount of a particular resin.

A 10.5" diameter column was packed to 45" height with Rohm and Haas XAD-4 polymeric resin. CharSol C-10 was passed down flow through the column at about 1400 ml/min. Samples were taken periodically and analyzed for phenols, carbonyls, browning index, and brix. Results are as follows:

TABLE 3
RESIN TREATMENT OF FAST PYROLYSIS LIQUIDS

| | Phenols mg/ml | Carbonyls % wt/vol | Browning Index | Brix |
|---|---|---|---|---|
| CharSol C-10 Feed | 17.0 | 12.4 | 9.9 | 25.9 |
| 10 gal. | 1.3 | 11.3 | 9.6 | 19.2 |
| 20 gal. | 2.4 | 11.1 | 10.1 | 21.0 |
| 30 gal. | 4.8 | 11.5 | 10.6 | 22.6 |
| 40 gal. | 6.3 | 11.5 | 10.4 | 23.2 |
| 50 gal. | 7.9 | 12.2 | 10.3 | 23.4 |
| 65 gal. | 12.5 | 11.8 | 9.5 | 24.4 |
| 75 gal. | 14.3 | NA | NA | 24.6 |
| 85 gal. | 15.3 | 11.3 | 9.5 | 24.6 |
| 95 gal. | 17.0 | NA | NA | 25.4 |
| 105 gal. | 16.8 | 12.6 | 9.3 | 26.0 |

NA = not analyzed

The results show that at about 95 gallons the polymeric resin is at maximum through-put capacity for the described column and that down to 1.3 mg/ml phenols no significant decrease in browning index is observed.

Alternatively, batch treatment of liquid smoke solutions with nonionic polymeric resins may be used. For example, 100 ml samples of CharSol C-10 were added to 10, 20, 30, and 40 gram portions of Rohm and Haas XAD-4. The samples were mixed on a magnetic stirrer for one hour and the desired liquids are separated from the polymeric resin by filtration.

EXAMPLE 3

Example 3 shows a method of making fast pyrolysis liquids with sufficiently high browning index content to be of use as starting material for the present invention.

A circulating fluid bed reactor was operated at 525° C. with nitrogen as a carrier gas under appropriate conditions to provide a 1.3 second residence time for the vapors produced from the rapid pyrolysis of maple sawdust. The feed rate was about 30 pounds per hour of 5% moisture maple sawdust. The total liquid yield was about 70%.

The raw liquid smoke was then analyzed for water content prior to preparing a diluted liquid smoke. The water content was about 5% by weight. Subsequently, a water dilution procedure was performed and the amounts of water soluble components were determined. Results reported below are the water soluble components as a weight to weight percent of the raw liquid smoke:

8.0% Organic acids
1.9% Phenols
22.7% Carbonyls

EXAMPLE 4

This example shows the range of dilutions of raw liquid smoke which are useful in producing diluted liquid smoke. The diluted liquid smoke made in the manner described in this example provides intermediates in the production of the product of the present invention.

To fifty gram samples of the raw liquid smoke of Example 3 were added aliquots of water in amounts listed below. Addition of water with mixing was followed by settling of the undesired insoluble phase. The desired aqueous phase was decanted, filtered, and analyzed.

The results are as follows:

TABLE 4
DILUTIONS OF RAW LIQUIDS

| Water Add.g | Tit. Acid. (w/v %) | % T | Brix | Browning Index | Brix/ Browning Index |
|---|---|---|---|---|---|
| 20 | 7.2 | 0 | 34.0 | 19.5 | 1.74 |
| 40 | 5.1 | 2 | 25.0 | 14.6 | 1.71 |
| 50 | 4.6 | 15 | 21.9 | 11.2 | 1.96 |
| 100 | 2.9 | 77 | 14.0 | 7.5 | 1.87 |
| 150 | 2.1 | 85 | 10.8 | 6.0 | 1.80 |
| 200 | 1.8 | 89 | 9.9 | 5.7 | 1.74 |

The diluted fast pyrolysis liquids produced had a brix range of between 9.9–34.0. The average brix/browning index ratio for these samples was 1.8/1.0. This ratio is substantially below the typical 2.5/1.0 ratio for slow pyrolysis liquids.

EXAMPLE 5

This example shows the method used to produce a resin treated liquid smoke which has greater than 50% transmittance when a 1:10 water dilution is measured spectrophotometrically at 590 nm.

The raw liquid smoke (6800 g) produced as in Example 3 was mixed with water (6000 g). After mixing, settling, and filtering as in Example 4, about 9.1 liters of 23.8 brix diluted liquid smoke were produced. The transmittance was measured at a dilution of 1:10 at 590 nm and was about 6%.

An 8 cm diameter×50 cm high column of Rohm and Haas XAD-4 polymeric resin was used to treat the diluted liquid smoke to produce a diluted liquid smoke having greater than 50% transmittance as defined above. The diluted liquid smoke was passed through a water filled polymeric resin column (XAD-4) at a flow rate of 250 ml/min. Desired product was collected beginning at about 10 brix. After the last portion of diluted liquid smoke was added to the column and no liquid head remained, water was added to maximize recovery and desired polymeric resin treated diluted liquid was collected down to about 10 brix. A total of 6.6 liters of 20 brix solution having about 91% transmittance was collected.

EXAMPLE 6

This example shows using a high vacuum evaporative concentration to produce a high browning liquid smoke composition.

A one liter sample of the polymeric resin treated liquid smoke of Example 5 was placed on a rotary evaporator and a water aspirator was used to pull a 29 inches of mercury vacuum. The flask was placed in a 50° C. water bath and rotated until the brix of the sample was determined to be about 45.1. The concentration time was approximately two hours. The resulting high browning liquid smoke composition had the following analyses:

45.1 Brix
8.9 w/w % Acids
21.3 mg/ml Phenols
32.5 w/v % Carbonyls
52% Transmittance
38 Browning Index
5.7 cp. Viscosity

EXAMPLE 7

This example shows the relationship between brix and other parameters for a high browning liquid smoke composition.

The polymeric resin treated diluted liquid smoke of Example 5 was concentrated under reduced pressure to various brix values and the resulting samples were analyzed for % transmittance, specific gravity, viscosity and browning index. The following results were obtained:

TABLE 5
CONCENTRATION OF DILUTED LIQUIDS

| Brix | % T | Specific Gravity | Viscosity (cp) | Browning Index | Browning Index/Brix |
|------|-----|------------------|----------------|----------------|---------------------|
| 40.2 | 62  | 1.127            | 4.2            | 41             | 1.02                |
| 49.3 | 50  | 1.164            | 7.6            | 48             | .97                 |
| 58.0 | 40  | 1.198            | 16.3           | 51             | .86                 |
| 67.4 | 32  | 1.240            | 61.1           | 60             | .89                 |
| 73.6 | 25  | 1.279            | 267.1          | 76             | 1.03                |

The maximum browning index for a liquid smoke solution may be obtained by optimizing the pyrolysis conditions. The longer vapor residence time in Example 3 of about 1.3 seconds produced an average browning index to acids ratio of about 2.8:1. This ratio is considerably smaller than the browning index to acids ratio obtained using the shorter vapor residence time specified in Example 1. In Example 1, the diluted samples having a benzo(a)pyrene content less than 0.5 ppb had an average browning index to acids ratio of about 4.5:1. The yield of acids from a given wood feedstock is relatively constant. Thus, use of raw liquid smoke having a 4.5:1 browning index to acids ratio may produce a final liquid smoke solution having a higher browning index at a given brix value than the liquid smoke solutions of Examples 3 to 7.

Resin treatment of a raw liquid smoke solution having a browning index to acids ratio of 4.5:1 and a browning index of about 21 may be concentrated according to the procedures described in Example 6 to yield a final product having a browning index of about 62 and a brix of about 45.

EXAMPLE 8

Cellulose in the form of Avicel (TM) pH101 was pyrolyzed in an entrained flow reactor as described in U.S. Pat. No. 4,876,108 and Example 1 above. A reactor temperature of 500° C. was maintained. The vapor residence time was 600 msec. A total liquid yield of 86% was realized, with the remainder being char and noncondensable gases.

A water soluble extract was prepared by adding water (125 ml) to the raw condensate (50 g). The preparation was heated to 175° F. and stirred on a magnetic stirrer for 10 minutes. After centrifugation, the water soluble extraction (171.1 g) was decanted. The extract was filtered through Gelman (TM) type A-E glass fiber filters. The latter will retain 95% of 1 micron particles. After filtration, the transmittance was 78%. The solution was concentrated by evaporation under vacuum at 50° C. to yield a solution with the following properties:

| Brix | 42 |
| % Transmittance | 52 |
| Browning Index | 35 |
| Carbonyls (% w/v) | 21.3 |
| Acids (% w/v) | 1.9 |
| Phenols (mg/ml) | 3.9 |

The results show the preparation of a high browning liquid smoke solution which has greater than 50% transmittance. The solution can be prepared from liquids condensed from the fast pyrolysis of cellulose without the need for solvent extraction or resin treatment.

The analyses on the water soluble extract are:

| Acids (% w/v) | 1.0 |
| Phenols (mg/ml) | 2.8 |
| Carbonyls (% w/v) | 9.8 |
| Browning Index | 16.3 |
| Brix | 23.0 |

EXAMPLE 9

The external surfaces of 21 mm. diameter cellulose frankfurter casings are treated with the high browning liquid smoke composition prepared in the manner of Example 8 by applying the liquid smoke composition to the external surfaces of the casings and allowing the heated casings to dry at about 80° C. The casings are conventionally moisturized to about 14–18 wt. % water and are shirred. The casings are stuffed with either an emulsion of the beef meats formulation of Table 6 or the high collagen meat formulation of Table 7.

TABLE 6
BEEF FORMULATION

| Ingredients | Weight (g) |
| --- | --- |
| Beef Chuck | 22.68 |
| Beef Plate | 22.68 |
| Salt | 1.13 |
| Water | 13.61 |
| Seasoning | 0.45 |
| Sodium Nitrite | 0.11 |

TABLE 7
HIGH COLLAGEN FORMULATION

| Ingredients | Weight (g) |
| --- | --- |
| Beef Chuck | 9.98 |
| Beef Tripe | 7.26 |
| Beef Shank | 7.26 |
| Beef Cheek | 7.26 |
| Regular Pork | 13.61 |
| Water | 9.98 |
| Salt | 1.13 |
| Seasoning | 0.45 |
| Sodium Nitrite | 0.11 |

The stuffed casings are processed under normal conditions of temperature and humidity as commercially practiced, but without the conventional step of smoke treatment. The meat product is cooked to an internal temperature of 68° C., cold water showered at 8° C. for 10 minutes and showered for 10 minutes with chilled water of 1.6° C. Processing conditions are sufficient to cause the transfer of smoke color and flavor from the casing to the frankfurters.

EXAMPLE 10

Application to Wieners

About 2.5 lb. strands of skinless wieners obtained from Cher-Make Sausage Co. (Manitowoc, WI) are dipped for 60 seconds in the high browning liquid smoke composition of Example 7.

The wieners were cooked to an internal temperature of 70° C. according to the following schedule: 43.3° C. for 10 minutes; 60.0° C. for 45 minutes; 71.1° C. for 25 minutes; and 82.2° C. until the internal temperature is 70° C.

After cooking, the wieners are placed in a 4.4° C. cooler overnight for subsequent evaluation and testing.

The following day, the wieners are peeled and found to have an appealing brown color and a desirable smoked appearance.

ANALYTICAL PROCEDURES

The techniques used to analyze liquid smoke compositions are well known to those of ordinary skill in the art. The acids in liquid smoke are measured as titratable acidity calculated as acetic acid. The procedure for determining phenols is a modified Gibbs method which measures phenols as 2,6-dimethoxyphenol and is described in Tucker, I.W. "Estimation of Phenols in Meat and Fat", *Journal of the Association of Official Analytical Chemists*, XXV, 779 (1942). The procedure for determining carbonyls is a modified Lappan-Clark method which measures carbonyls as 2-butanone and is described in "Colorimetric Method for Determination of Traces of Carbonyl Compounds", *Analytical Chemistry*, 23, 541-542 (1959). Both procedures for determining carbonyls and phenols are fully described in U.S. Pat. No. 4,431,032, the disclosure of which is herein incorporated by reference.

The procedures used to determine the browning index of a sample are described in U.S. Pat. No. 4,876,108 the relevant portions describing analytical techniques and procedures which are herein incorporated by reference. Briefly, the browning index is a relative measure of the ability of carbonyls to react with the amino acid, glycine. Tests have shown good correlation between the browning index values of a solution of smoke flavoring and the extent of brown color formation on meat surfaces.

What is claimed is:

1. A high browning liquid smoke composition comprising:
   a liquid solution having a brix of less than about 50, a browning index greater than about 30, and a transmittance value greater than about 50% at 590 nm.

2. A liquid smoke composition of claim 1 wherein the ratio of browning index to brix is greater than about 0.7.

3. A liquid smoke composition of claim 1 wherein the browning index is greater than about 35.

4. A liquid smoke composition of claim 3 wherein the browning index is about 35-65.

5. A liquid smoke composition of claim 4 wherein the brix is less than 45.

6. A liquid smoke composition of claim 5 wherein the brix is about 35-45.

7. A method for making a high browning liquid smoke composition comprising the steps of:
   a) collecting the condensable liquids produced by the fast pyrolysis of wood or cellulose to give a raw liquid smoke;
   b) diluting the raw liquid smoke with water to substantially separate undesired water insoluble components to give a diluted liquid smoke of less than about 40 brix;
   c) contacting the diluted liquid smoke with a nonionic polymeric resin to give a treated liquid smoke; and
   d) concentrating the treated liquid smoke to give a high browning liquid smoke composition having a brix of less than about 50, a browning index greater than about 30, and a transmittance value greater than about 50% at 590 nm.

8. A method of claim 7 wherein the diluted liquid smoke mixture has a brix of about 4-40 and a browning index of about 5-30.

9. A method of claim 8 wherein the diluted liquid smoke mixture has a brix of about 5-30 and a browning index of about 6-19.5.

10. A method of claim 9 wherein the high browning liquid smoke composition has a brix of about 49, a browning index of about 48, and a transmittance value of about 50%.

11. A method of claim 8 wherein the diluted liquid smoke mixture has a brix of about 20-25.

12. A method of claim 7 wherein the treated liquid smoke has a transmittance value of about 90%.

13. A method of claim 7 wherein the diluted liquid smoke contacts an amount of nonionic polymeric resin of about one part by weight diluted liquid smoke to about one to three parts by weight nonionic polymeric resin.

14. A method of claim 13 wherein the diluted liquid smoke contacts an amount of nonionic polymeric resin of about one part by weight diluted liquid smoke to about two to three parts by weight nonionic polymeric resin.

15. A method of claim 7 wherein the condensable liquids are produced by the fast pyrolysis of wood.

16. A method of claim 15 wherein the condensable liquids have a ratio of browning index to titratable acidity of about 2.5:1 to 4.5:1.

17. A method for making a high browning liquid smoke composition comprising the steps of:
   a) collecting the condensable liquids produced by the fast pyrolysis of cellulose to give a raw liquid smoke;
   b) diluting the raw liquid smoke with water to substantially separate undesired water insoluble components to give a diluted liquid smoke of less than about 40 brix;
   c) concentrating the treated liquid smoke to give a high browning liquid smoke composition having a brix of less than about 50, a browning index greater than about 30, and a transmittance value greater than about 50% at 590 nm.

18. A method of claim 17 wherein the diluted liquid smoke mixture has a brix of about 4-40 and a browning index of about 5-30.

19. A method of claim 18 wherein the diluted liquid smoke mixture has a brix of about 5-30 and a browning index of about 6-19.5.

20. A method of claim 19 wherein the high browning liquid smoke composition has a brix of about 42, a browning index of about 35, and a transmittance value of about 52%.

21. A method of claim 18 wherein the diluted liquid smoke mixture has a brix of about 20-25.

22. An edible food product comprising a food substrate and a high browning liquid smoke composition having a brix of less than about 45, a browning index greater than about 30, and a transmittance value greater than about 50% at 590 nm.

23. A food product of claim 22 wherein the food substrate is selected from the group consisting of meat, poultry, and fish.

24. A process for flavoring and coloring a food product comprising the steps of:
   a) collecting the condensable liquids produced by the fast pyrolysis of wood or cellulose to give a raw liquid smoke;
   b) diluting the raw liquid smoke with water to substantially separate undesired water insoluble components to give a diluted liquid smoke of less than about 40 brix; and
   c) contacting the diluted liquid smoke with a nonionic polymeric resin to give a treated liquid smoke;
   d) concentrating the treated liquid smoke to give a high browning liquid smoke composition having a brix of less than about 50, a browning index greater than about 30, and a transmittance value greater than about 50% at 590 nm; and
   e) contacting the food product with the high browning liquid smoke composition.

25. A process of claim 24 wherein the food product is a casing.

26. A process of claim 25 wherein the casing is a cellulose casing.

27. A process of claim 24 wherein the food product is an edible foodstuff selected from the group consisting of meat, poultry, and fish.

28. A process of flavoring and coloring a food product comprising the steps of:
   a) collecting the condensable liquids produced by the fast pyrolysis of cellulose to give a raw liquid smoke;
   b) diluting the raw liquid smoke with water to substantially separate undesired water insoluble components to give a diluted liquid smoke of less than about 40 brix;
   c) concentrating the treated liquid smoke to give a high browning liquid smoke composition having a brix of less than about 50, a browning index greater than about 30, and a transmittance value greater than about 50% at 590 nm; and
   d) contacting the food product with the high browning liquid smoke composition.

29. A process of claim 28 wherein the food product is a casing.

30. A process of claim 29 wherein the casing is a cellulose casing.

31. A process of claim 28 wherein the food product is an edible foodstuff selected from the group consisting of meat, poultry, and fish.

* * * * *